United States Patent
Chang et al.

(10) Patent No.: US 8,717,677 B2
(45) Date of Patent: May 6, 2014

(54) OPTICAL DEVICE AND OPTICAL FILTER

(75) Inventors: Yu-Shan Chang, Taichung (TW);
Fu-Shiang Yang, Hsinchu (TW);
Hau-Wei Wang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 740 days.

(21) Appl. No.: 12/061,860

(22) Filed: Apr. 3, 2008

(65) Prior Publication Data

US 2009/0168182 A1    Jul. 2, 2009

(30) Foreign Application Priority Data

Dec. 28, 2007  (TW) ................ 96150816 A

(51) Int. Cl.
*G02B 5/28* (2006.01)
*G02B 1/10* (2006.01)

(52) U.S. Cl.
USPC ..................... 359/589; 359/587; 359/586

(58) Field of Classification Search
USPC ......... 359/578, 579, 580, 586, 587, 588, 885, 359/888, 589; 250/226; 427/248.1
See application file for complete search history.

(56) References Cited

U.S. PATENT DOCUMENTS

| | | | | |
|---|---|---|---|---|
| 2,676,114 A | * | 4/1954 | Barkley | 427/248.1 |
| 3,746,429 A | * | 7/1973 | Spindel et al. | 359/888 |
| 5,646,399 A | * | 7/1997 | Fukushima et al. | 250/226 |
| 6,700,690 B1 | | 3/2004 | Buchsbaum et al. | |
| 7,042,662 B2 | * | 5/2006 | Murata et al. | 359/888 |

FOREIGN PATENT DOCUMENTS

JP    2004-151310 A    5/2004

OTHER PUBLICATIONS

Taiwan Patent Office, Office Action, Patent Application Serial No. 096150816, Aug. 31, 2011, Taiwan.

\* cited by examiner

*Primary Examiner* — Audrey Y Chang

(57) ABSTRACT

An optical device is provided. The optical device comprises a substrate having a coating region and a non-coating region. A first film is on the coating region, wherein the first film has a band edge structure extending to a portion of the non-coating region with an angle between a surface of the band edge structure and a surface of the first film to diminish the attenuation of an incident light beam.

13 Claims, 4 Drawing Sheets

US 8,717,677 B2

OPTICAL DEVICE AND OPTICAL FILTER

BACKGROUND OF THE INVENTION

1. Field of the Invention

The present invention relates to an optical device, and in particular, to an optical filter.

2. Description of the Related Art

Spectrometers are widely used for measuring spectra of test samples (for example, liquid crystal displays) and calculating optical parameters such as chromaticity and luminance. A conventional spectrometer sequentially comprises a grating, which is generally used for a beam-splitting device, a long-pass filter, which is also called an order-sorting filter, disposed in front of a photodetector. The order-sorting filter is used to filter a beam of second order diffracted light having a shorter wavelength spatially overlapped with a beam of first order diffracted light having a longer wavelength. The conventional order-sorting filter has an optical film partially coated thereon, resulting in a sharp step-liked edge of the optical film between a coating region and a non-coating region of the order-sorting filter. The sharp step-liked edge of the optical film does not allow light signals to be received by the photodetector behind the filter because an incident light beam can not transmit through the sharp step-liked edge of the conventional order-sorting filter and thus a spectrum with a dark line occurs. The dark line spectrum problem causes spectra measuring error, a reduced measuring area of the order-sorting filter, a reduced velocity and less accuracy of in-line measurement.

U.S. Pat. No. 6,700,690 describes a conventional variable tunable bandpass optical filter 10 comprising a filter pair 1 and 2 as shown in FIG. 1. The conventional variable tunable bandpass optical filter 10 is comprised of two transparent optical substrates, upon each of which is deposited a linearly variable multilayered interference filter coating which varies in total thickness from end to end in a wedged fashion, creating a filter pair 1 and 2. The wedged coating imparts a corresponding variation of the center wavelength of the filter bandpass with respect to the linear position of the filter pair 1 and 2. The variable tunable bandpass optical filter 10, referred to as a linear variable filter (LVF), can be adjusted to a specific center wavelength by moving the filter pair 1 and 2 together linearly through the incident beam. The size of the conventional variable tunable bandpass optical filter 10, however, is too large (length×height×width: 57 mm×10 mm×0.7 mm) to install in a small-sized spectrometer. The conventional variable tunable bandpass optical filter also has shortcomings such as a difficult and costly fabricating process.

Therefore, an optical device with quick and precise spectra measurement is needed.

BRIEF SUMMARY OF INVENTION

To solve the above-described problems, an optical device and an optical filter is provided. An exemplary embodiment of an optical device comprises a substrate having a coating region and a non-coating region. A first film is on the coating region, wherein the first film has a band edge structure extending to a portion of the non-coating region with an angle between a surface of the band edge structure and a surface of the first film to diminish the attenuation of an incident light beam.

An exemplary embodiment for an optical filter comprises an optical substrate having a coating region and an adjacent non-coating region. The first optical film on the coating region has a band edge structure extending to a portion of the non-coating region with an angle between a surface of the band edge structure and a surface of the first optical film to diminish the attenuation of an incident light beam.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3b shows a cross section along line A-A' of FIG. 3a.

Figure 1:
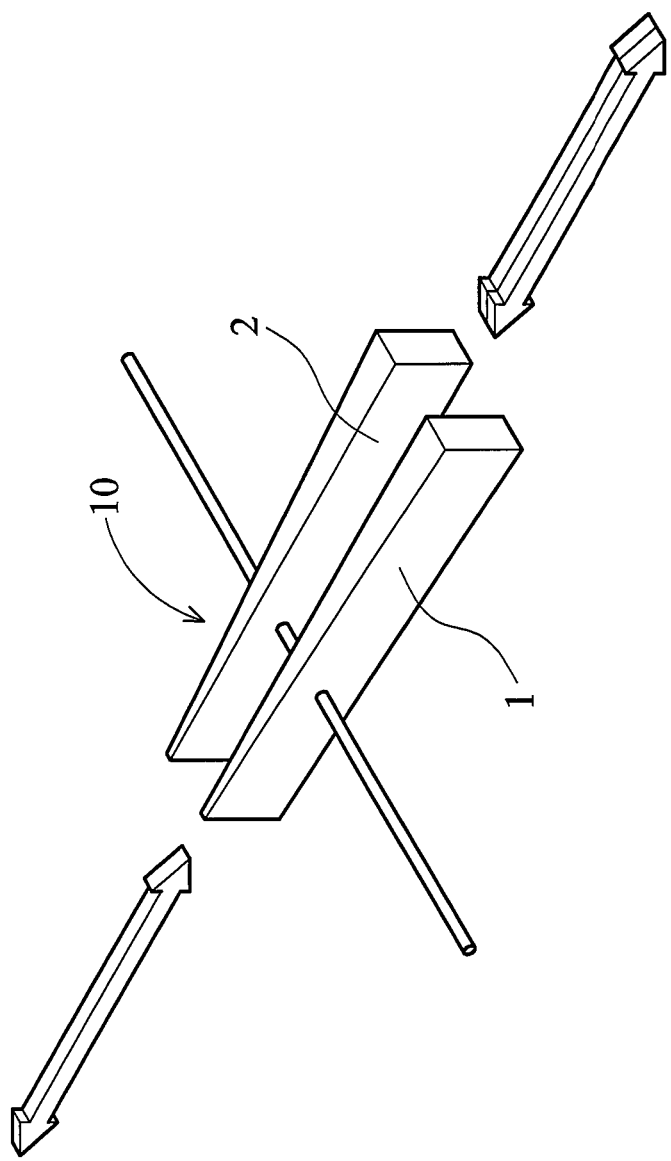
FIG. 1 shows a conventional variable tunable bandpass optical filter.

Table 1 shows attenuation results of various incident light intensity through an embodiment of a band edge structure of an optical filter of the invention.

DETAILED DESCRIPTION OF INVENTION

The following description is about a mode of carrying out the invention. This description is made for the purpose of illustrating the general principles of the invention and should not be taken in a limiting sense. The scope of the invention is determined by reference to the appended claims. Wherever possible, the same reference numbers are used in the drawings and the descriptions to refer the same or like parts.

Figure 2:
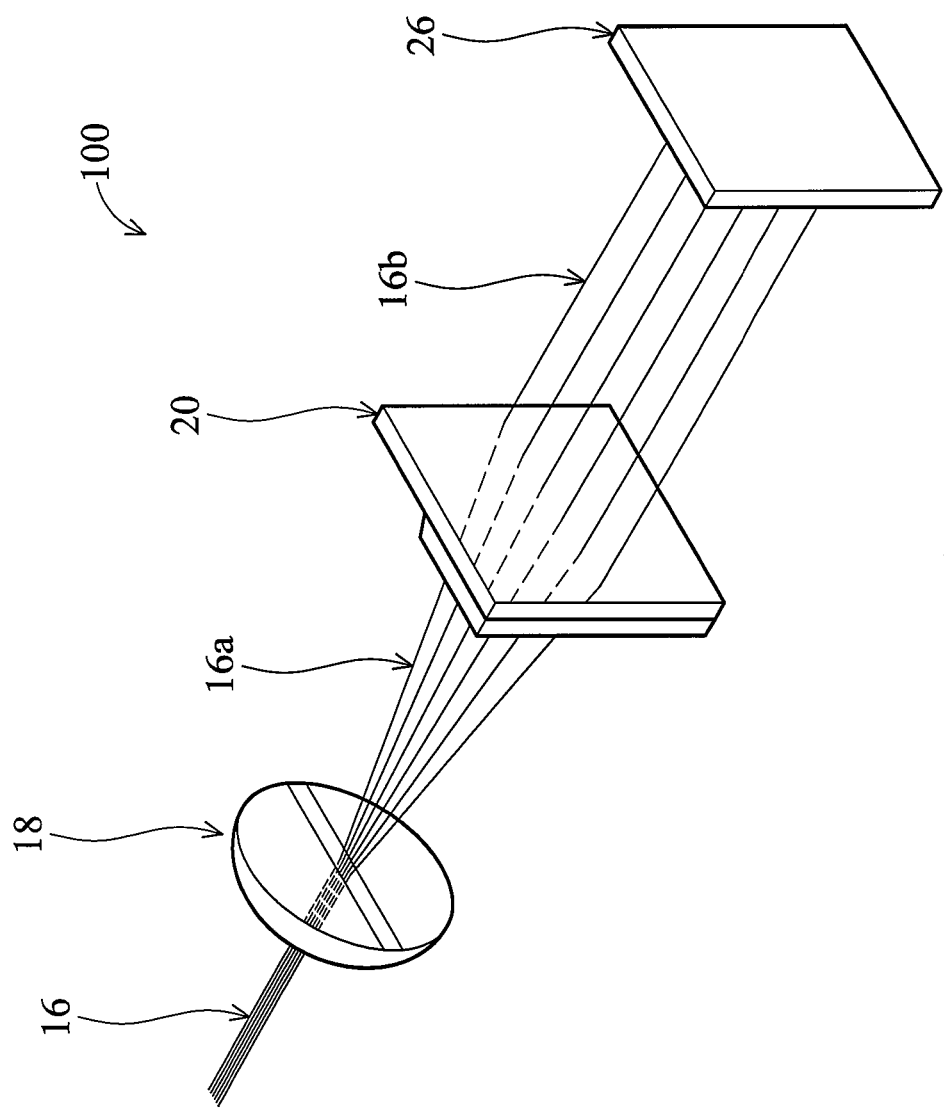
FIG. 2 shows a schematic view of an embodiment of an optical device of the invention.

FIG. 2 shows a schematic view of an embodiment of an optical device 100 of the invention. The optical device 100 comprises a beam splitting device 18, an optical filter 20 and a photodetector 26. In one embodiment, the optical device 100 may serve as a spectrometer 100. An incident light beam 16 with different wavelengths may be split into several beams of diffracted light 16a with different orders by using the beam splitting device 18. In one embodiment, the incident light beam 16 may be from a tungsten-halogen lamp or the like. A wavelength of the incident light beam 16 is about of 300 nm to 1000 nm. The beam splitting device 18 may comprise a grating.

Next, diffracted lights 16b with a specific range of wavelengths are formed by filtering the diffracted lights 16a using the optical filter 20. Spatial spectrum distribution of the diffracted lights 16b is received by the photodetector 26, which is disposed in the rear of the optical filter 20 to allow light to propagate to the optical filter 20 prior to the photodetector 26. In one embodiment, the photodetector 26 may comprise a charge couple device (CCD).

Figure 3B:
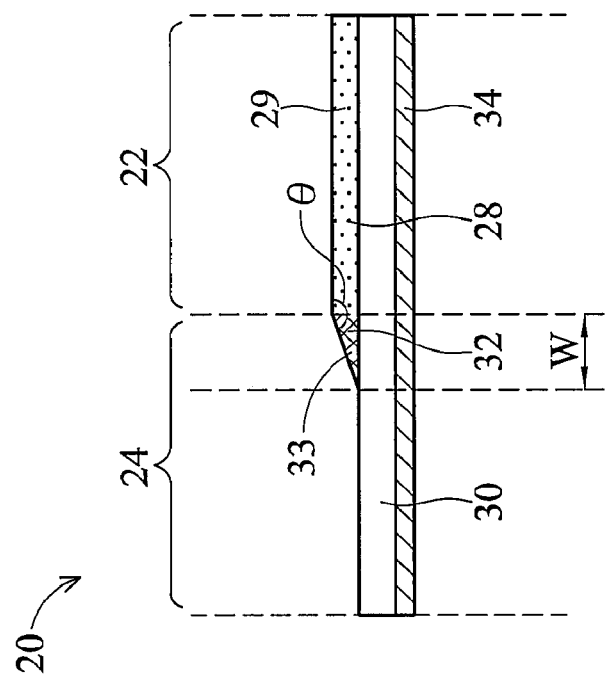
Figure 3A:
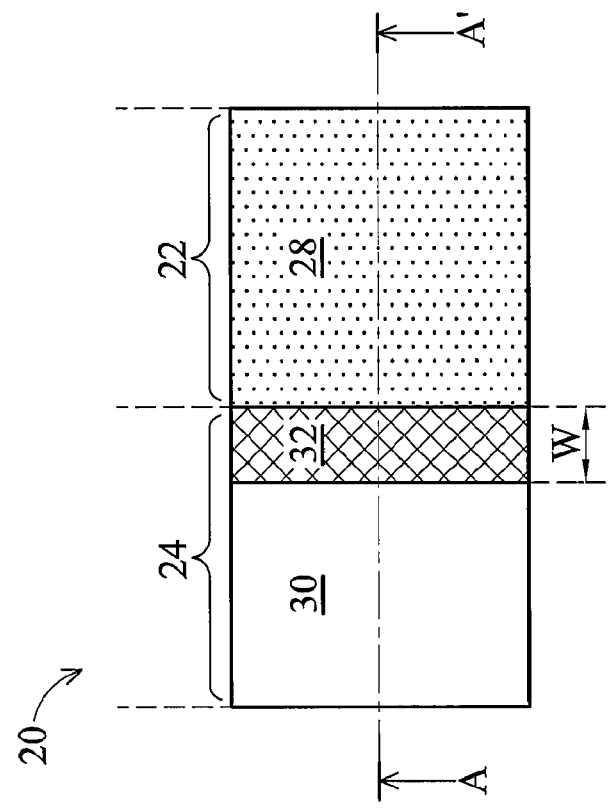
FIG. 3a shows a top view of an embodiment of an optical filter of the invention.

FIG. 3a shows a top view of an embodiment of an optical filter 20 of the invention. FIG. 3b is a cross section along line A-A' of FIG. 3a showing the optical filter 20. In one embodiment, the optical filter 20 may serve as an order-sorting filter. The optical filter 20 may comprise a substrate 30 having a coating region 22 and an adjacent non-coating region 24. A first film 28 is formed on the coating region 22, wherein the first film 28 has a band edge structure 32 extending to a portion of the non-coating region 24. In one embodiment, the substrate 30 may comprise transparent optical substrates, for example, glasses, germanium, silicon, sapphire or plastics. Next, a first film 28 may be formed on the substrate 30 by a physical vapor deposition (PVD) method comprising evaporation or sputtering. In one embodiment, the first film 28 may comprise oxide optical films, for example, $Ti_3O_5$ or $SiO_2$. Additionally, transmission of an incident light beam with a 555 nm to 1000 nm wavelength through the first film 28 is about 70% to 100%. Transmission of an incident light beam with a 300 nm to 505 nm wavelength through the first film 28 is about 0% to 1%. The aforementioned embodiment shows the transmission of the first film 28 for the incident light beam in a visible light wavelength region. Also, the transmission of the first film 28 may be changed if the wavelength of the incident light is in a near-infrared ray wavelength region. The transmission and the wavelength of the incident light sorted by the first film 28 may be defined by requirements. As shown in FIG. 2, the incident light beam 16 with different wavelengths may be split into several beams of diffracted light 16a with different diffraction orders by the beam splitting device 18, for example, a grating 18. Characteristics of the diffracted lights 16a may satisfy a grating equation shown as $m\lambda=d(\sin\alpha+\sin\beta)$, wherein m is defined as a diffraction order of the diffracted light, $\lambda$ is defined as a wavelength of the diffracted light, d is defined as a groove period of the grating, and $\alpha$ and $\beta$ are respectively defined as an incident angle and a diffracted angle. The grating equation shows that if values of d, $\alpha$ and $\beta$ are given, a first order diffracted light at a wavelength of the diffracted lights 16a may spatially overlap with a second order diffracted light at half of the wavelength of the diffracted light 16a. For example, a first order diffracted light at a wavelength of 850 nm may spatially overlap with a second order diffracted light at a wavelength of 425 nm. Therefore, the coating region 22 of the substrate 30 may be located in a spatial region where first order diffracted light of the diffracted light 16a with longer wavelengths distribute. For example, the coating region 22 of the substrate 30 may be located in a spatial distribution region of first order diffracted light of the diffracted light 16a with 555 nm to 1000 nm wavelength. Therefore, first order diffracted light with longer wavelengths may be allowed to pass through the first film 28, and second order diffracted light with shorter wavelengths may be reflected by the first film 28, and thus an order-sorting function is applied. For example, first order diffracted light with 850 nm wavelength may be allowed to pass through the first film 28, and second order diffracted light with 425 nm wavelength may be reflected by the first film 28.

As shown in FIGS. 3a and 3b, the band edge structure 32 may extend from the coating region 22 to a portion of the non-coating region 24. The band edge structure 32 may be a portion of the first film 28. In one embodiment, the band edge structure 32 has an angle θ between a surface 33 of the band edge structure 32 and a surface 29 of the first film 28. For example, the angle θ may be about 90° to 180°. A width W of the band edge structure 32 may be about 0.3 nm to 0.6 nm. A thickness, anywhere on the band edge structure 32, may be thinner than that of the first film 28. Alternatively, the width W of the band edge structure 32 may be tuned to smaller than 0.3 nm or larger than 0.6 nm by requirements.

As shown in FIG. 3b, for diminution of the attenuation of an incident light beam, a thickness of the band edge structure 32 may gradually increase along a direction (for example, from left to right) to satisfy a graduated distribution. In other embodiments, a thickness of the band edge structure 32 may satisfy various types of distribution without limitation, for example, uniform distribution or waveform distribution. The aforementioned thickness distributions of the band edge structure 32 may enable the angle θ between the surface 33 of the band edge structure 32 and a surface 29 of the first film 28 to be about 90° to 180°. Alternatively, the aforementioned thickness distributions of the band edge structure 32 may enable the band edge structure 32 to have a thickness thinner than that of the first film 28 in the coating region 22. Therefore, the diffracted lights 16a may still transmit through the band edge structure 32.

Alternatively, a second film 34 may be formed on the substrate 30 opposite to the first film 28, covering the coating region 22 and the adjacent non-coating region 24. The second film 34 may serve as an anti-reflection film 34 to avoid a ghost image generated by multiple reflections of some of the diffracted light 16b between the photodetector 26 and the optical filter 20. Additionally, the second film 34 may also avoid a reflection of the diffracted lights 16a, which is generated at an interface of the optical filter 20, to reduce the intensity of the diffracted lights 16b. Therefore, transmission of the diffracted lights 16b received by the photodetector 26 may be improved. In one embodiment, the second film 34 may be formed on the substrate 30 by a physical vapor deposition (PVD) method, for example, evaporation or sputtering. The second film 34 may comprise $MgF_2$, SiO, $SiO_2$, ZnS, $PbF_2$, $TiO_2$ or combinations thereof.

Figure 4:
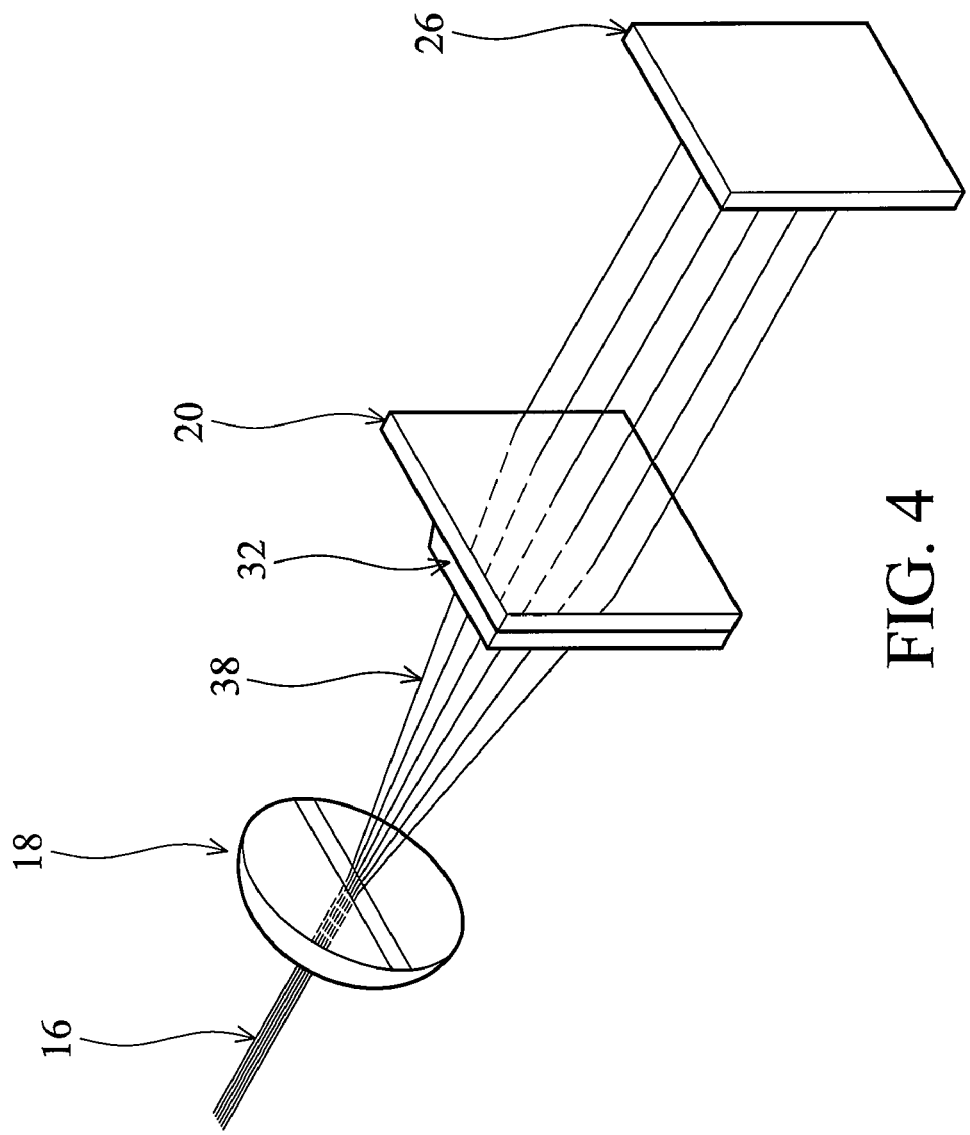
FIG. 4 shows a method for measuring attenuation of various incident light intensity through an embodiment of a band edge structure of an optical filter of the invention.

Table 1 shows attenuation results of various incident light beam intensities of an embodiment of a band edge structure 32 of an optical filter 20 of the invention. FIG. 4 shows a measuring method for attenuation of various incident light beam intensities through an embodiment of a band edge structure 32 of an optical filter 20 of the invention. As shown in FIG. 4, the optical filter 20 is disposed in front of the photodetector 26. An incident light beam 16 with tunable intensity is split by the beam splitting device 18 and then the diffracted light 38 propagates through the optical filter 20, receiving by the photodetector 26 for measurement of spatial spectrum distribution of intensity. As shown in Table 1, for example, when the maximum intensity of incident light beam 38 is about 4000 counts, the intensity of the incident light beam 38 transmitting through the area adjacent to the band edge structure 32 on the optical filter 20 is about 3700 counts, and the intensity of the incident light beam 38 transmitting through the band edge structure 32 is about 3250 counts. A calculation of the intensity of the incident light beam 38 transmitting through the area adjacent to the band edge structure 32 on the optical filter 20 minus the intensity of the incident light beam 38 transmitting through the band edge structure 32 shows that attenuation of a 3700 count incident light beam 38 transmitting through the band edge structure 32 is about 450 counts, and percentage of the attenuation of the incident light beam is about 12.16%. Additionally, when the maximum intensity of the incident light beam 38 is about 250 counts, the intensity of the incident light beam 38 transmitting through the area adjacent to the band edge structure 32 on the optical filter 20 is about 250 counts, and the intensity of the incident light beam 38 transmitting through the band edge structure 32 is also about 250 counts. After calculation, no attenuation occurs for a 250 count incident light beam 38 transmitting through the band edge structure 32. From Table 1 we know that as the incident light beam intensity is weaker, the attenuation of an incident light beam transmitting through the band edge structure 32 is less. Additionally, when the maximum intensity of the incident light beam is about 4000 to 6000 counts, the percentage of the incident light beam attenuation is about 0% to 60%, preferably about 0% to 14%. Therefore, an embodiment of the optical filter 20 shows no significant attenuation of an incident light beam transmitting through the band edge structure 32 of the first film 28. The photodetector 26 may still receive light signals of an incident light beam through the band edge structure 32, and the spatial spectrum distribution may be compensated by proper correcting methods.

TABLE 1 attenuation results of various incident light intensitiy through an
embodiment of a band edge structure of an optical filter of the invention.

| maximum intensity of incident light beam (count). | intensity of incident light beam transmitting through the area adjacent to the band edge structure on the optical filter (count). | intensity of incident light beam transmitting through the band edge structure. (count) | attenuation of an incident light beam transmitting through the band edge structure (count). |
|---|---|---|---|
| 4000 | 3700 | 3250 | 450 |
| 3500 | 3400 | 3000 | 400 |
| 3000 | 2800 | 2400 | 400 |
| 2000 | 1800 | 1600 | 200 |
| 1500 | 1250 | 1150 | 100 |
| 1000 | 900 | 800 | 100 |
| 250 | 250 | 250 | 0 |

In an embodiment of an optical filter 20 of the invention, the band edge structure 32 of the first film 28 may smooth an edge of the film 28 between the coating region 22 and the non-coating region 24, allowing an incident light beam to propagate through the band edge structure 32 and be received by the photodetector. An error of spatial spectrum distribution due to a dark light spectrum received by the photodetector, which is generated if an incident light beam can not transmit through a step-liked edge between the coating region and the non-coating region of an optical film of the conventional optical filter may be mitigated. Additionally, an embodiment of an optical filter 20 of the invention has advantages of order sorting for diffracted light, no limitation in filter dimensions, lower costs and a simpler fabrication process. Therefore, the optical filter 20 is more suitable to be used in in-line spectrometers because of reduced fabrication costs, and has the potential to replace all optical filters used in the future.

While the invention has been described by ways of examples and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
   a beam splitting device configured to split an incident light beam into at least a first order diffracted light and a second order diffracted light, wherein the first order diffracted light at a first wavelength spatially overlaps the second order diffracted light at a second wavelength different than the first wavelength;
   a substrate having a coating region and an adjacent non-coating region, wherein the coating region is located where the first and second order diffracted light spatially overlap; and
   a first film on the coating region, wherein the first film has a band edge structure extending from a portion of the first film having a uniform thickness to a portion of the non-coating region, and wherein an angle is formed between a surface of the band edge structure and a surface of the portion of the first film having uniform thickness to diminish the attenuation of the first and second order diffracted light, configured such that a transmittance of the portion of the first film having uniform thickness for the spatially overlapping first order diffracted light having the first wavelength and the second order diffracted light having the second wavelength is 70% to 100% and 0% to 1%, respectively.

2. The optical device as claimed in claim 1, wherein attenuation of an incident light transmitting through the band edge structure has a range of 0% to 60%.

3. The optical device as claimed in claim 1, wherein a thickness of the band edge structure is thinner than that of the first film.

4. The optical device as claimed in claim 1, wherein an angle θ between a surface of the band edge structure and a surface of the first film is 90° to 180°.

5. The optical device as claimed in claim 1, wherein a width of the band edge structure is 0.3 nm to 0.6 nm.

6. The optical device as claimed in claim 1, further comprising a photodetector in the rear of the substrate to allow a light to propagate to the substrate prior to the photodetector.

7. The optical device as claimed in claim 1, further comprising a anti-reflection film on the substrate, opposite to the first film.

8. An optical filter, comprising:
   a beam splitting device configured to split an incident light beam into at least a first order diffracted light and a second order diffracted light, wherein the first order diffracted light at a first wavelength spatially overlaps the second order diffracted light at a second wavelength different than the first wavelength;
   an optical substrate having a coating region and an adjacent non-coating region, wherein the coating region is located where the first and second order diffracted light spatially overlap; and
   a first optical film on the coating region, wherein the first optical film has a band edge structure extending from a portion of the first optical film having a uniform thickness to a portion of the non-coating region, and wherein an angle is formed between a surface of the band edge structure and a surface of the first optical film to diminish the attenuation of the first and second order diffracted light, configured such that a transmittance of the portion of the first optical film having uniform thickness for the spatially overlapping first order diffracted light having the first wavelength and the second order diffracted light having the second wavelength is 70% to 100% and 0% to 1%, respectively.

9. The optical filter as claimed in claim 8, wherein attenuation of an incident light transmitting through the band edge structure has a range of 0% to 60%.

10. The optical filter as claimed in claim 8, wherein an angle θ between a surface of the band edge structure and a surface of the first optical film is 90° to 180°.

11. The optical filter as claimed in claim 8, wherein a thickness of the band edge structure is thinner than that of the first optical film.

12. The optical filter as claimed in claim 8, wherein a width of the band edge structure is 0.3 nm to 0.6 nm.

13. The optical filter as claimed in claim 8, further comprising a anti-reflection film on the optical substrate, opposite to the first optical film.

\* \* \* \* \*